W. WENDERHOLD.
AUTOMATIC REEL THREADING DEVICE.
APPLICATION FILED JULY 20, 1915.

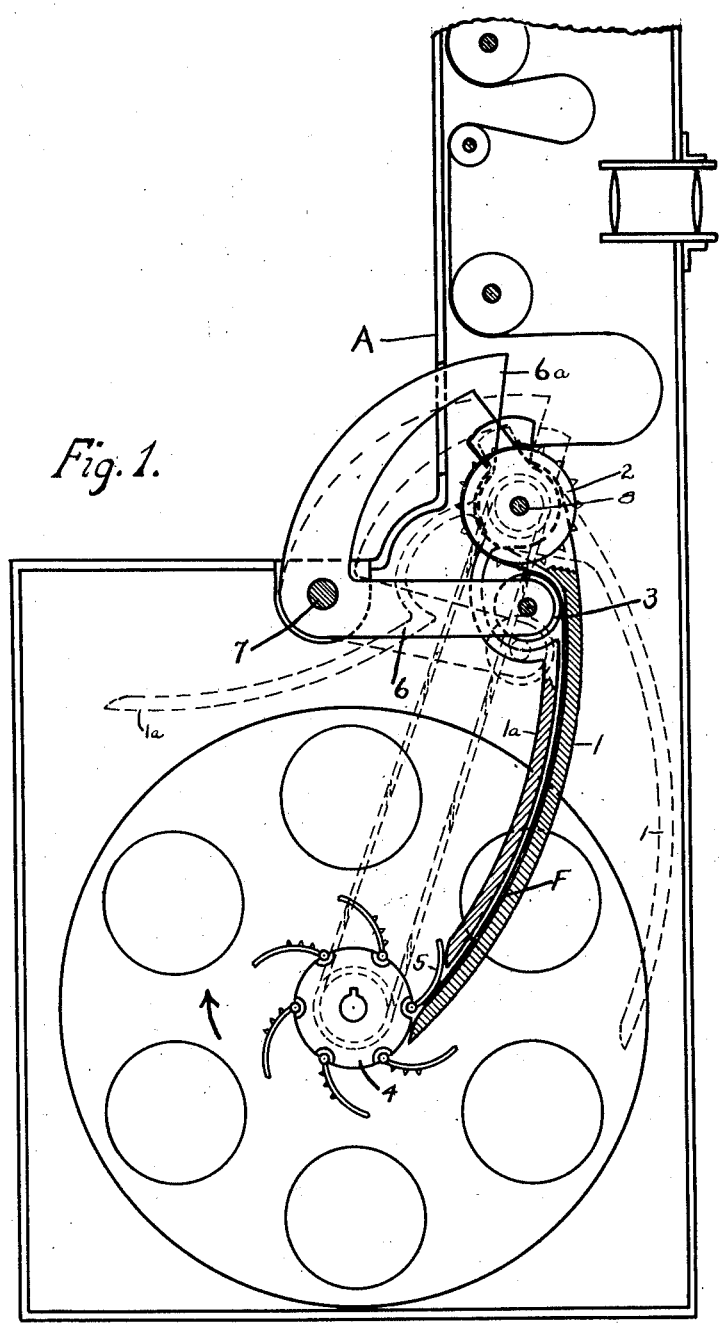

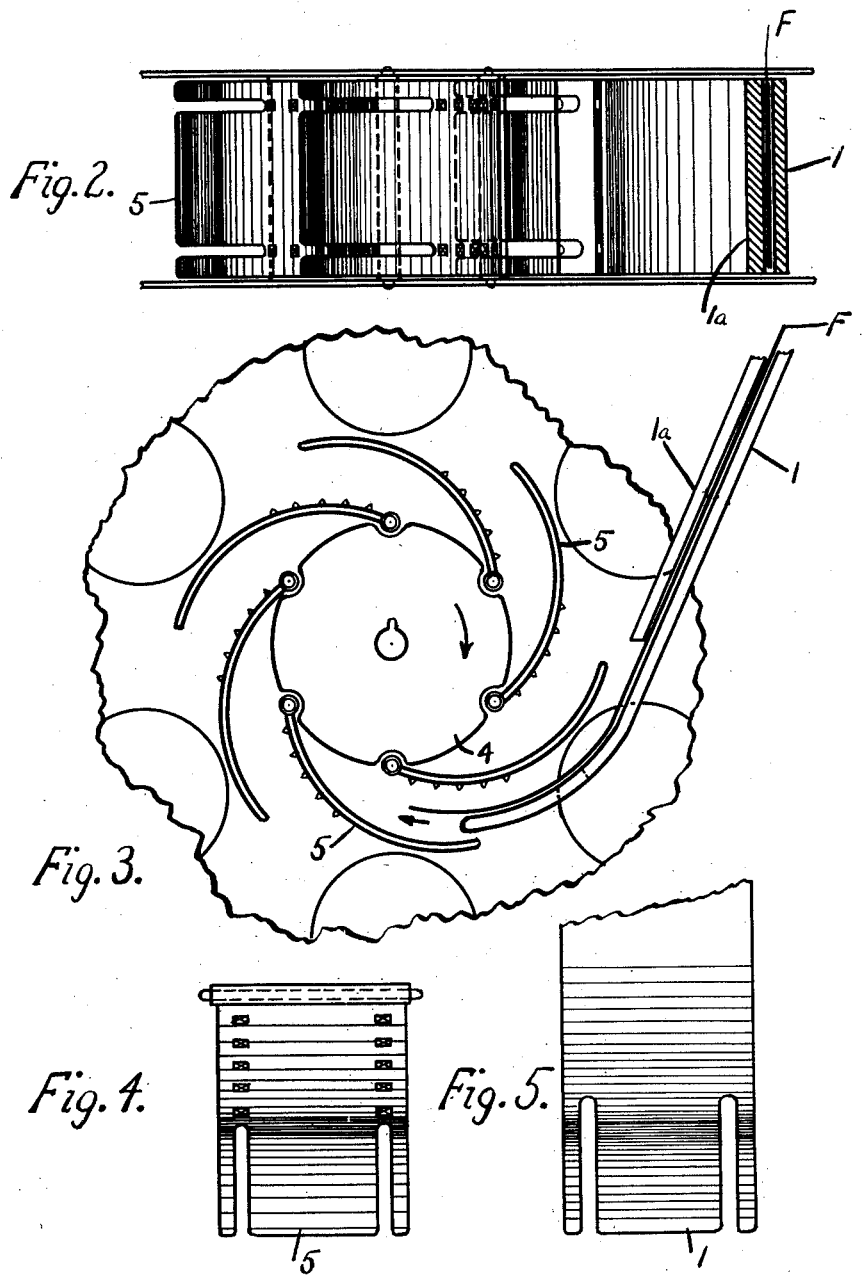

1,346,356. Patented July 13, 1920.
3 SHEETS—SHEET 3.

WITNESSES
Robert Richter
J. J. Weis

INVENTOR.
William Wenderhold

UNITED STATES PATENT OFFICE.

WILLIAM WENDERHOLD, OF NEW YORK, N. Y., ASSIGNOR TO CRU PATENTS CORPORATION, A CORPORATION OF NEW YORK.

AUTOMATIC REEL-THREADING DEVICE.

1,346,356.     Specification of Letters Patent.     Patented July 13, 1920.

Application filed July 20, 1915. Serial No. 40,985.

*To all whom it may concern:*

Be it known that I, WILLIAM WENDERHOLD, a citizen of the United States, residing at New York city, in the county and State of New York, have invented certain new and useful Improvements in Automatic Reel-Threading Devices. of which the following is a clear, full, and exact description.

This invention relates to motion picture apparatus, and more particularly to a film reel on which a film is to be wound and the means that will deliver and guide the film from a film apparatus to said reel, or from one reel to another reel.

The object of my invention is to provide an automatic guide means that will deliver the film to the reel hub without the aid of an operator, and the further object is to provide a grasping or catching device on the reel that will automatically engage said film without the aid of an operator for the purpose of winding the film on said reel.

Referring to the drawings,

Figure 1 is a vertical section through a motion picture machine and the automatic guide and the take-up reel.

Fig. 2 is a perspective view into the reel and guide.

Fig. 3 is a partial side view of the reel hub and guide adjacent.

Fig. 4 is a perspective view of one of the film catchers as used on the reel hub.

Fig. 5 is a partial illustration of the lower end of the automatic guide.

Figure 6:
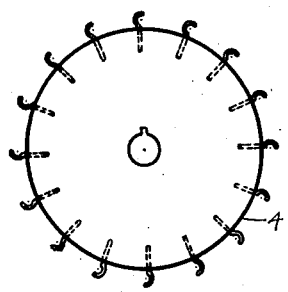
Figs. 6, 7, 8, 9, 10 and 11 are illustrations of different forms of reel hubs usable in this device, but they do not depart from the spirit of my invention.

To carry out the object of my invention, I provide a double film guide 1 and 1ª to receive the film F from the usual lower feed sprocket 2 in the motion picture machine A. The film is delivered past the roller 3 and forced down between the guides 1 and 1ª to the film reel hub 4. On the film reel hub are mounted flying catchers 5 and the teeth thereon engage the film and wind it around the hub. The hub 4 is driven by the usual contrivances from a point in the kinetoscope. The reel hub 4 is driven slightly faster than the speed at which the film is delivered, and therefore as soon as the film is caught by the catchers 5 a tension is brought upon the film between the hub of the reel and the feed sprocket 2. This tension will act upon the roller 3, said roller being mounted in a frame 6, said frame 6 being yieldably mounted on pivot point 7. This yieldable frame has a wedge arm 6ª. The tension in the film will pull the roller 3 and its frame downward and the arm 6ª will wedge itself between the short lever ends of the two guides 1 and 1ª, above the sprocket 2 as shown by the dotted lines in Fig. 1 of the drawings and cause them to spread apart, since they are mounted pivotally on the shaft 8, which is also the shaft driving the feed sprocket 2, the two guides 1 and 1ª therefore will be forced apart when the film has tension, and the film can only be under tension if the reel hub 4 has engaged the film, and the guides are superfluous and should preferably be moved away so they will not interfere with the regular feeding and winding of the film.

The dotted lines in Fig. 1 show the position of the two guides when the film is being wound. From the foregoing it is readily understood that the film is automatically manipulated without human aid by the mere rotation of the apparatus.

Figure 7:
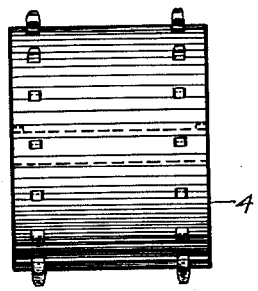
Figure 8:
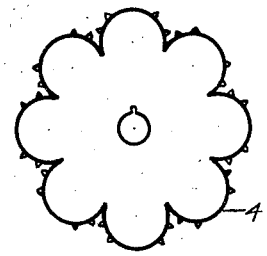
Figure 9:
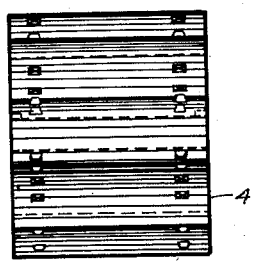
Figure 10:
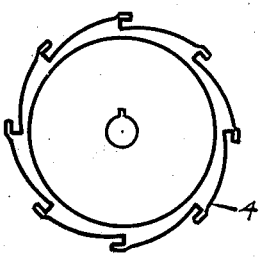
Figure 11:
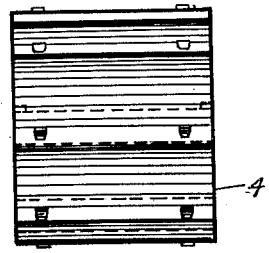

Figs. 6 to 11 inclusive are merely illustrations of a few of the many ideas I have for grasping the film on the film hub, and I therefore deem it sufficient to illustrate them without elaborate description, since all of them are merely projections on the reel hubs to engage the film automatically whenever it is delivered thereto.

What I claim is:

1. In a film winding device, a reel, driving means therefor, projections on the hub of said reel to engage a film during rotation, and a film guide extending into said reel near said hub to deliver a film to the hub, and means controlled by the film to move said guide away from said reel when the film is being wound on said reel, automatically and substantially as described.

2. In a motion picture apparatus, a film reel and a feed sprocket, a film delivery guide delivering from said sprocket to said reel, a pivoted lever, a roller carried at one end thereof and lying in the path of travel of said film to normally bear against the surface of said film, and means actuated by the tension of the film upon said roller for removing said delivery guide out of the path of said film.

3. In a film winding device, a film, a film reel, and swinging catchers provided with teeth thereon, mounted on said reel for engaging said film and a guide for delivering the film to said catchers.

4. The combination with a film reel, a feed sprocket, a film, a guide delivering said film from said sprocket to said reel, means carried by said reel for engaging said film, and means operated by the winding of said film upon said reel for removing said guide out of the reel path.

Signed at New York city, New York, this 17th day of June, in the year one thousand nine hundred and fifteen.

WILLIAM WENDERHOLD.

Witnesses:
F. F. WEISS,
ROBERT RICHTER.